United States Patent Office 3,474,141
Patented Oct. 21, 1969

3,474,141
PROCESS FOR THE PREPARATION OF ACRYL-
AMIDE AND METHACRYLAMIDE
Charles Laviron, Claude Darcas, and Rene Allirot, Saint-
Avold, France, assignors to Ugine Kuhlmann, Paris,
France, a corporation of France
No Drawing. Filed July 6, 1966, Ser. No. 563,026
Claims priority, application France, July 8, 1965
23,946
Int. Cl. C07c 103/08
U.S. Cl. 260—561                                1 Claim

ABSTRACT OF THE DISCLOSURE

An improvement in the hydrolyzation process of preparing acrylamide and methacrylamide wherein a corresponding acrylonitrile or methacrylonitrile is hydrolyzed with sulphuric acid having a concentration of 84% and at a rate of one mole of the acid for from 1.05 to 15.0 moles of the nitrile to obtain a hydrolyzation product containing less than 1.0% acrylic or methacrylic acid which is neutralized and the amide extracted having substantially no acid therewith.

This invention relates to a process for obtention of acrylamide or methacrylamide containing very little or no corresponding acrylic acid.

The primary industrial method for the production of acrylic and methacrylic amides comprises hydrolyzing the corresponding nitriles in an acidic medium according to the reaction:

(I)
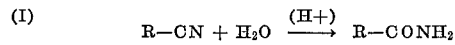

In most cases the utilized acid is sulphuric acid and reaction I is followed by a hydrolysis of the obtained amide into the corresponding acid, according to the reaction:

(II)
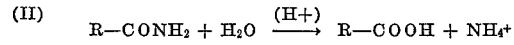

The most frequently utilized method to hydrolyze acrylic or methacrylic nitriles comprises reacting one mole of water with one mole of acrylonitrile or methacrylonitrile in the presence of one mole of sulphuric acid. Water is introduced most conveniently together with the acid, as 84.5% by weight sulphuric acid. The reaction is carried out around 100° C. and lasts 1 to 2 hours, and at the end of reaction, the amide appears in the form of its sulphuric salt. Then by analysis, it is observed that in the most favorable cases, about 6% by weight of the water utilized for the hydrolysis has reacted according to the reaction II with production of acrylic or methacrylic acid.

The separation of the amide from the sulphuric acid constitutes the next step in the conventional production of the amide. It is carried out in a usual manner by neutralizing the medium with a base of average strength in water or in an appropriate solvent, without exceeding a pH of about 7, so as to avoid parasitic reactions which are detrimental to the amide. The amide thus liberated remains in solution in water or in the organic solvent. Then, by any known procedure, the amide solution of the sulphate resulting from the neutralization is separated and in the separation, solubility of the sulphate in the medium according to the neutralizing reagent utilized is taken into account. Finally, the amide is obtained by water or solvent evaporation, concentration and eventual crystallization. However, the raw solution from the initial hydrolysis always contains a certain amount of organic acid, some of which eludes the neutralization and remains in important amounts in the final product.

For various reasons, and particularly for obtention of a pure amide utilizable in reactions or applications where the presence of the acid is unwanted, it is desirable to synthesize, as early as the reaction step of the nitrile hydrolysis, an amide free from an organic acid and to prevent development of reaction II.

This invention effects the hydrolysis of acrylic or methacrylic nitriles under such conditions that the obtained amide from the hydrolysis reaction contains small amounts of, less than about 1%, or no corresponding acid.

The process comprises carrying out the nitrile hydrolysis in the presence of sulphuric acid, with 0.5 to 1.5 moles of sulphuric acid and 1.05 to 15 moles of nitrile per 1 mole of water, the continuous or discontinuous introduction of reagents being such that there is at all times an excess of nitrile relative to the water.

It is preferable to use 1 mole of sulphuric acid and 1.5 to 2 moles of nitrile per mole of water.

The conditions of temperature and reaction time remain those commonly used, i.e. generally the operation is carried out between 80° and 120° C. and lasts 1 to 3 hours.

Neutralization, extraction, concentration and crystallization of the amide are carried out afterwards according to the usual methods.

According to the invention, it is possible to considerably reduce or to totally avoid the formation of organic acids which usually accompany acrylic and methacrylic amides. Thus, as early as the first step of the amide production— that is during sulphuric acid hydrolysis of the nitrile— an amide solution is obtained substantially free from acrylic or methacrylic acid. This is an important advantage in comparison with the prior process.

Indeed, in numerous processes for the polymerization or the copolymerization of acrylamide, it is necessary to carefully control conditions so that the organic acid content of the medium is very low (less than about 1%), or if possible null.

The acrylic and methacrylic amides free from acrylic and methacrylic acid obtained according to the invention permit the obtention of polymers or copolymers of exactly controlled qualities and are particularly adapted for methylolation.

The following Example 1 relates to an operation carried out according to a known procedure and Examples 2 to 5, which are nonlimitative, illustrate the process of the invention.

Example 1

In this example, the acrylamide was prepared by acrylonitrile hydrolysis under known conditions, that is with no excess of nitrile relatively to water.

1 mole of sulphuric acid and 1 mole of water as 84.5% acid were introduced continuously into a reactor, together with 1 mole of acrylonitrile. The flow-rates were about 754 g./h. of 84.5% sulphuric acid at 84.5%, that is 426 cm.³/h., and 344 g./h. acrylonitrile, that is 430 cm.³/h. The temperature was regulated at 100° C., and the reaction medium stayed 120 minutes in the reactor.

The raw solution of sulphuric acrylamide flowing out of the reactor was analyzed. It contained 1.28% acrylic acid, from which it can be deduced that 6% of the water engaged reacted according to reaction II and 94% according to reaction I.

201 g. were taken out at the reactor outlet and diluted with 200 g. water and 600 g. acetone while the temperature was lowered down to 20° C.

The solution thus obtained was neutralized at 20° C. by 40.30 g. of gaseous ammonia and ammonium sulphate precipitated. It was filtered and washed with acetone, and dried to recover 157 g. ammonium sulphate containing 0.38% acrylamide.

The aqueous acetonic solution of the amide was then distilled to eliminate acetone. There remained a residue formed of an aqueous solution of acrylamide weighing 146.3 g., and containing 52.4% amide and about 1.5% acrylic acid.

Example 2

In this example and the following ones, the operation was carried out according to the invention.

In the same reactor as in Example 1, the reagents were introduced in the following proportions: 1 mole of sulphuric acid, 1 mole of water in the form of 84.5% acid and 1.25 mole of acrylonitrile.

The flow-rates were such that the total time of stay was 90 minutes; and the temperature was maintained between 95 and 100° C.

The obtained sulphuric amide containing 0.425% acrylic acid corresponding to 2.150% of the utilized water so that the utilization rate of water for the hydrolysis reaction of acrylonitrile was 97.85%.

The final solution of acrylamide obtained as in Example 1 contained 0.515% acrylic acid.

Example 3

Into the same reactor as in Example 1, 1 mole of sulphuric acid and 1 mole of water together with 1.4 mole of acrylonitrile were introduced continuously. The flow-rates were regulated in order that the stay time should be 120 minutes, and the temperature was maintained between 84 and 100° C.

The obtained sulphuric amide contained 0.317% acrylic acid corresponding to 1.676% of the utilized water whereby the ultization rate of the water into amide was about 98.32%.

The final solution of acrylamide obtained as in Example 1 contained 0.337% acrylic acid.

Example 4

Into the same reactor as in Example 1 the reagents necessary for the production of acrylamide were continuously introduced under the following conditions: 1 mole of sulphuric acid, 1 mole of water and 1.7 mole of acrylonitrile. The flow-rates were such that the stay time in the reactor was 150 minutes.

The temperature of the reactor was regulated between 85°C. and 91° C.

By chemical analysis and chromatography, it was observed that the sulphuric amide obtained was totally free from acrylic acid and water. The utilization rate of water according to the hydrolysis reaction of acrylonitrile into acrylamide was practically 100%.

The final acrylamide solution obtained as in Example 1 contained no acrylic acid.

Example 5

Into the same reactor as the one already utilized in the preceding examples, there were continuously introduced in the following proportions 1 mole of sulphuric acid, 1 mole of water, and 15 moles of methacrylonitrile. The flow-rates were such that the stay time wasi 180 minutes, and the temperature was maintained between 92 and 95° C.

The sulphuric methacrylamide thus obtained was free from methacrylic acid and water. The utilization rate of the water for the hydrolysis reaction of methacrylonitrile reached 100%.

The final methacrylamide solution obtained as in Example 1 contained no methacrylic acid.

We claim:

1. In a process for the preparation of an amide selected from the group consisting of acrylamide and methacrylamide wherein the hydrolyzation product of the corresponding acrylonitrile or methacrylonitrile is neutralized and the corresponding amide is extracted, concentrated and crystallized, the improvement comprising preparing a hydrolyzation product containing less than 1.0% acrylic or methacrylic acid by hydrolyzing the corresponding acrylonitrile or methacrylonitrile with sulfuric acid having a concentration of about 84.5% by weight at a rate of one mole of said acid for from 1.05 to 15.0 moles of said nitrile.

References Cited

UNITED STATES PATENTS

| 3,257,454 | 6/1966 | Heckle | 260—561 |
| 2,734,915 | 2/1956 | Jones | 260—526 |
| 3,301,900 | 1/1967 | Talet | 260—561 |
| 3,023,242 | 2/1962 | Bornemann et al. | 260—561 |
| 2,683,173 | 7/1954 | Weisgerber | 260—561 |

FOREIGN PATENTS 631,592  11/1949  Great Britain.

NICHOLAS S. RIZZO, Primary Examiner

J. A. NARCAVAGE, Assistant Examiner